US010613000B2

(12) United States Patent
Palanganda Poonacha et al.

(10) Patent No.: US 10,613,000 B2
(45) Date of Patent: Apr. 7, 2020

(54) SYSTEM AND METHOD FOR DETERMINING AN EXHAUST EMISSION PARAMETER PROFILE

(71) Applicant: GENERAL ELECTRIC COMPANY

(72) Inventors: Samhitha Palanganda Poonacha, Karnataka (IN); Anish Bekal, Karnataka (IN); Rachit Sharma, Karnataka (IN); Chayan Mitra, Karnataka (IN); Eric YuHang Fung, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/831,801

(22) Filed: Dec. 5, 2017

(65) Prior Publication Data

US 2018/0172554 A1    Jun. 21, 2018

(30) Foreign Application Priority Data

Dec. 15, 2016   (IN) .............................. 201641042797

(51) Int. Cl.
  *G01M 15/10*   (2006.01)
  *G01N 21/31*   (2006.01)
  (Continued)

(52) U.S. Cl.
  CPC ............ *G01M 15/108* (2013.01); *G01J 3/00* (2013.01); *G01J 3/021* (2013.01); *G01J 3/42* (2013.01);
  (Continued)

(58) Field of Classification Search
  USPC ........................................ 73/114.69, 114.71
  See application file for complete search history.

(56) References Cited

U.S. PATENT DOCUMENTS

| 4,990,780 A | * | 2/1991 | Lee | ........................ G01N 21/39 250/339.13 |
| 5,317,156 A | | 5/1994 | Cooper et al. | |

(Continued)

FOREIGN PATENT DOCUMENTS

CN           102183316 B       4/2013

OTHER PUBLICATIONS

Bodart, P.,"UV LED absorption spectroscopy for pulsed plasma diagnostics," 63rd Annual Gaseous Electronics Conference and 7th International Conference on Reactive Plasmas, vol. 55, No. 7, p. 1 (Oct. 5, 2010) (Abstract).

(Continued)

*Primary Examiner* — Eric S. McCall
(74) *Attorney, Agent, or Firm* — James W. Pemrick; Charlotte C. Wilson

(57) ABSTRACT

A method for determining a multi-dimensional profile of at least one emission parameter corresponding to an exhaust emission of a combustion process is presented. The method includes emitting a laser beam in a plurality of directions through the exhaust emission. The laser beam includes a plurality of wavelengths and the exhaust emission is characterized by the plurality of emission parameters. The method further includes detecting a plurality of absorption spectrum signals for each of the plurality of directions and determining a plurality of single-dimensional profiles corresponding to the at least one emission parameter. Each of the plurality of single-dimensional profiles is determined based on the plurality of absorption spectrum signals corresponding to each respective direction of the plurality of directions. The method also includes generating the multi-dimensional profile corresponding to the at least one emission parameter based on the plurality of single-dimensional profiles.

20 Claims, 6 Drawing Sheets

(51) Int. Cl.
*G01J 3/00* (2006.01)
*G01J 5/00* (2006.01)
*G01J 3/02* (2006.01)
*G01J 3/42* (2006.01)
*G01J 5/60* (2006.01)

(52) U.S. Cl.
CPC ............ *G01J 5/0014* (2013.01); *G01J 5/602* (2013.01); *G01N 21/31* (2013.01); *G01J 2005/0081* (2013.01); *G01N 2201/066* (2013.01)

(56) References Cited

U.S. PATENT DOCUMENTS

| | | | |
|---|---|---|---|
| 7,298,490 B2 | 11/2007 | Baer et al. | |
| 9,012,851 B2 | 4/2015 | Scherer et al. | |
| 9,377,358 B2 | 6/2016 | Graybeal et al. | |
| 2009/0039284 A1* | 2/2009 | Goto | G01J 3/02 250/432 R |
| 2009/0164138 A1* | 6/2009 | Goto | G01N 21/3504 702/24 |
| 2009/0229250 A1* | 9/2009 | Yamakage | G01N 15/0205 60/276 |
| 2009/0248350 A1* | 10/2009 | Yamakage | G01K 11/125 702/134 |
| 2009/0323068 A1* | 12/2009 | Yamakage | G01N 21/031 356/437 |
| 2010/0272557 A1* | 10/2010 | Woodmansee | F23N 5/082 415/118 |
| 2011/0019193 A1* | 1/2011 | Danno | G01J 3/4338 356/433 |
| 2011/0154806 A1* | 6/2011 | Hoyte | F01N 3/208 60/276 |
| 2012/0287418 A1 | 11/2012 | Scherer et al. | |
| 2014/0075954 A1* | 3/2014 | Tralshawala | G01M 15/10 60/779 |
| 2018/0259448 A1* | 9/2018 | Sharma | G01N 21/3504 |

OTHER PUBLICATIONS

Gao, N., et al., "Tunable diode laser absorption spectroscopy for sensing CO and CO2 of vehicle emissions based on temperature tuning," International Conference on Business Management and Electronic Information (BMEI), pp. 853-856 (May 13-15, 2011).

Liu, K., et al., "Highly sensitive detection of methane by near-infrared laserabsorption spectroscopy using a compact dense-pattern multipass cell," Sensors and Actuators B, vol. 220, pp. 1000-1005 (2015).

Liu, C., et al., "Measurement of nonuniform temperature and concentration distributions by combining line-of-sight tunable diode laser absorption spectroscopy with regularization methods," Applied Optics, vol. 52, No. 20, pp. 4827-4842 (Jul. 10, 2013).

Peng, C., et al., "High-Speed Mid-Infrared Frequency Modulation Spectroscopy Based on Quantum Cascade Laser," IEEE photonics technology letters, vol. 28, No. 16, pp. 1727-1730 (Aug. 15, 2016).

Yu, X., et al., "Spatial resolved temperature measurement based on absorption spectroscopy using a single tunable diode laser," Acta Mechanica Sinica, vol. 26, No. 1, pp. 147-149 (2010).

* cited by examiner

SYSTEM AND METHOD FOR DETERMINING AN EXHAUST EMISSION PARAMETER PROFILE

BACKGROUND OF THE INVENTION

Embodiments of the present specification relate generally to spectroscopic measurements, and more particularly to systems and methods for determining a parameter profile in multiple dimensions corresponding to a parameter in an exhaust emission.

Industrial plants and combustion based machinery emit gaseous effluents from the exhaust during operation. Emission of gaseous effluents are constrained by regulatory limits. Analysis of gaseous effluents from the exhaust chamber aids in estimating a plurality of emission parameters such as, but not limited to, a temperature and a pressure of the exhaust emission or a concentration of a species in the exhaust emission. Emission parameters may be used for controlling the operation of the industrial plants to comply with the regulatory requirements. Further, the emission parameters may also be used to determine the health of an engine such as a gas turbine used in the industrial plants.

Conventional in-situ, non-contact techniques entail passing a laser beam through the exhaust emission to measure the emission parameters. In traditional line-of-sight techniques for measuring the emission parameters, an average of parameter values along a laser path is acquired. However, in many applications, heat transfer with the side wall of a combustion chamber, cold boundary layers, gas diffusion, and other effects result in non-uniform temperature and pressure distributions along the laser path, thereby adversely affecting the measurement of the emission parameters.

Additionally, measuring/determining intermediate values of the emission parameters at multiple locations along the laser path may not be practically feasible. Moreover, measuring emission parameters in a two-dimensional (2D) space or a three-dimensional (3D) space poses additional challenges. For example, measuring the emission parameters at multiple locations along a line, a 2D surface, or in a 3D volume is a time consuming and laborious task. In some scenarios, positioning the measuring device at one or more of these multiple locations may be an onerous task. Further, currently available measurement setups may not be suitable for performing measurements of all parameters related to the exhaust emission and species in the exhaust emission. In addition, the instrument setup may be bulky and non-portable.

BRIEF DESCRIPTION OF THE INVENTION

In accordance with one aspect of the present specification a method for determining a multi-dimensional profile of at least one emission parameter of a plurality of emission parameters corresponding to an exhaust emission of a combustion process is presented. The method includes emitting a laser beam in a plurality of directions through the exhaust emission of the combustion process, where the laser beam includes a plurality of wavelengths and where the exhaust emission is characterized by the plurality of emission parameters. The method further includes detecting a plurality of absorption spectrum signals corresponding to a plurality of modulation depths for each of the plurality of directions. Moreover, the method includes determining a plurality of single-dimensional profiles corresponding to the at least one emission parameter, where each of the plurality of single-dimensional profiles is determined based on the plurality of absorption spectrum signals corresponding to each respective direction of the plurality of directions. The method also includes generating the multi-dimensional profile corresponding to the at least one emission parameter based on the plurality of single-dimensional profiles.

In accordance with another aspect of the present specification, a system for determining a multi-dimensional profile of at least one emission parameter of a plurality of emission parameters corresponding to an exhaust emission of a combustion process is presented, where the plurality of emission parameters characterizes the exhaust emission the system. The system includes a measurement unit having an emitter and a detector and is configured to align the emitter and the detector in a plurality of directions through the exhaust emission. The emitter includes a laser source and is configured to emit a laser beam including a plurality of wavelengths in the plurality of directions. The detector includes a wavelength separation unit configured to generate a plurality of absorption spectrum signals corresponding to the plurality of wavelengths for each direction of the plurality of directions. The system further includes a processing unit communicatively coupled to the detector and configured to determine a plurality of single-dimensional profiles corresponding to the at least one emission parameter, where each of the plurality of single-dimensional profiles is determined based on the plurality of absorption spectrum signals corresponding to each respective direction of the plurality of directions. The processing unit is further configured to generate the multi-dimensional profile corresponding to the at least one emission parameter based on the plurality of single-dimensional profiles.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments of systems and methods for determining a multi-dimensional profile of an emission parameter corresponding to an exhaust of a combustion process are presented. In particular, single-dimensional profiles of the emission parameter are obtained using spectroscopic signals. The multi-dimensional profile of the emission parameter is determined using a plurality of single-dimensional profiles corresponding to the exhaust of the combustion process in an engine. Embodiments disclosed herein provide enhanced resolution in variation of the emission parameter in multi-dimensions that may be used for controlling the operation of the combustion process or for monitoring and diagnostics purposes.

The term 'combustion process' refers to a chemical process that facilitates reaction of a fuel with an oxidizer to generate an exhaust emission with heat. Also, the term 'species' refers to one or more gaseous components or moisture in the gaseous effluents released from/produced by the engine. The term 'emission parameter' refers to a physical parameter of an exhaust chamber of the engine such as, but not limited to, a temperature or a pressure of the exhaust emission, and a concentration of a gaseous component in the exhaust emission. The term 'profile' refers to a record of an emission parameter in one dimension along a linear path, in a two-dimensional (2D) space such as a plane, or in a three-dimensional (3D) space such as a volume. The term 'multi-dimensional profile' is used to refer to a 2D profile or a 3D profile of an emission parameter. The terms 'plurality of profiles' and 'plurality of single-dimensional profiles' are used equivalently and interchangeably. Also, the term 'spectroscopic signal' refers to a signal generated consequent to an interaction of a laser beam with the exhaust emission.

Figure 1:
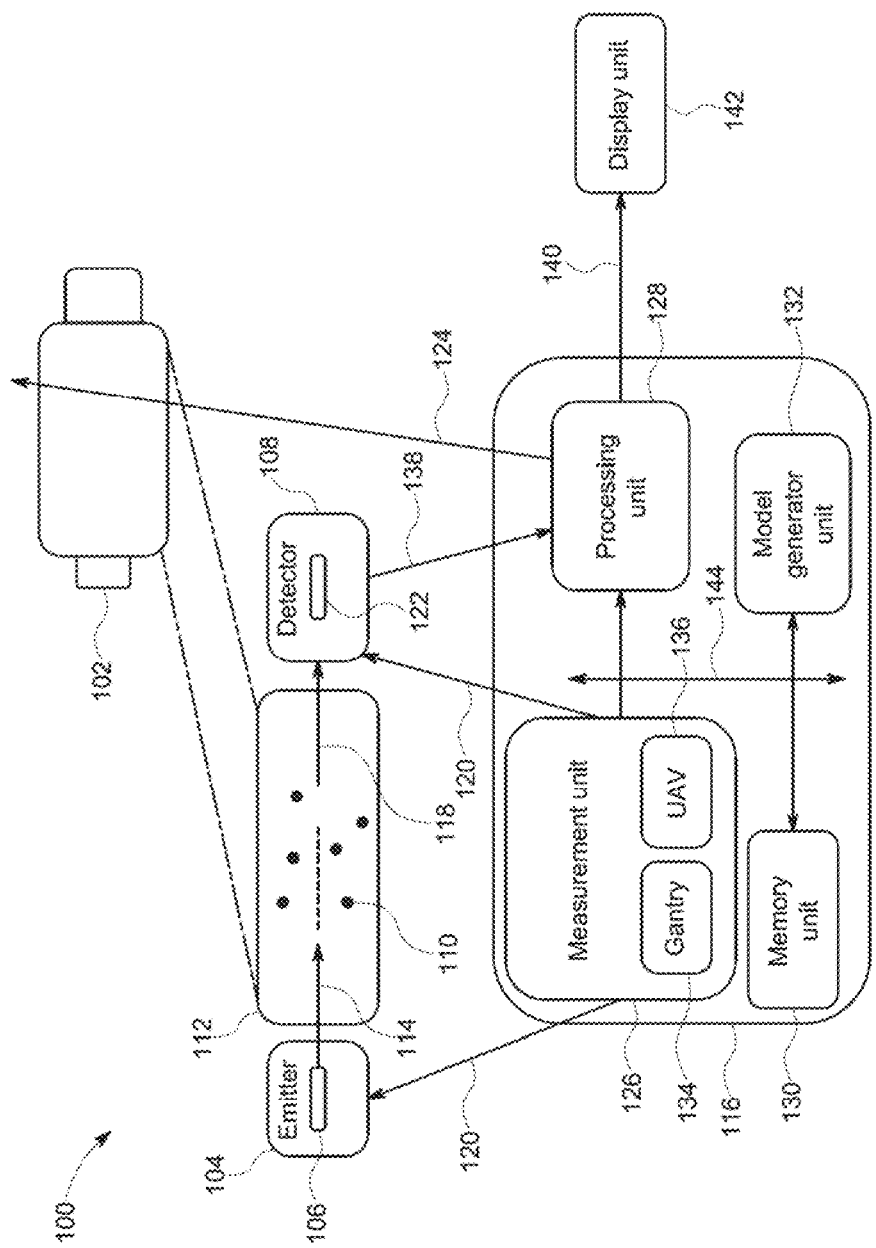
FIG. 1 is a block diagram representation of a system for determining a multi-dimensional profile of an emission parameter, in accordance with aspects of the present specification.

FIG. 1 is a diagrammatical representation of a system 100 for determining a multi-dimensional profile of a parameter related to one or more species in an exhaust emission of a combustion process, in accordance with aspects of the present specification. It may be noted that in the present specification, the determination or measurement of the multi-dimensional profile of an emission parameter is described with reference to a combustion process in an engine 102 such as a gas turbine. However, use of the system 100 may also find application in combustion processes of other machines and/or systems such as an aviation engine.

The system 100 includes an exhaust chamber 112. In the illustrated embodiment, the exhaust chamber 112 corresponds to exhaust outlet of the engine 102. In one embodiment, the exhaust chamber 112 may be a furnace configured to facilitate the combustion of the fuel. Any byproducts of the combustion process may be discharged to the environment via an outlet of the exhaust chamber 112. This discharge or emission from the exhaust chamber 112 may generally be referred to as exhaust emission 110. The exhaust emission 110 may include one or more gaseous species generated due to the operation of the engine. Environmental conditions of the exhaust chamber 112 such as the temperature and/or pressure may also vary during the operation of the engine 102.

The system 100 includes a spectroscopic measurement subsystem 116 communicatively coupled to the exhaust chamber 112 and configured to determine the operating conditions of the exhaust emission 110 and one or more parameters corresponding to the plurality of species in the exhaust emission 110. In one embodiment, the spectroscopic measurement subsystem 116 is employed to determine a multi-dimensional profile 140 of an emission parameter. The term emission parameter used to refer to one or more 'exhaust parameters' representative of operating condition of the exhaust emission 110 and one or more 'species parameters' representative of parameters of a gaseous component of the exhaust emission 110. The spectroscopic measurement subsystem 116 is further configured to generate a control signal 124 based on the multi-dimensional profile of at least one of the emission parameters. Further, the control signal 124 is used to modify the operation of the engine 102 by changing one or more engine operating parameters. The changing of the one or more engine operating parameters of the engine 102 in turn modifies the emission parameters and results in effective exhaust control. The system 100 further includes a display unit 142 configured to visualize the multi-dimensional profile 140 corresponding to the at least one emission parameter.

In a presently contemplated configuration, the measurement subsystem 116 includes a measurement unit 126, a processing unit 128, a model generator unit 132, and a memory unit 130. In the illustrated embodiment, the system 100 further includes an emitter 104 and a detector 108 coupled to the measurement unit 126. In an alternative embodiment, the emitter 104 and the detector 108 may be included in the measurement subsystem 116. The emitter 104 includes a laser source 106 configured to emit a laser beam 114 in a plurality of directions through the exhaust emission 110 in the exhaust chamber 112 of the engine 102. The detector 108 is configured to receive a plurality of spectroscopic signals 118 generated in response to an interaction of the exhaust emission 110 with the laser beam 114. The detector 108 further includes a wavelength separation unit 122 communicatively coupled to the processing unit 128 and configured to select a plurality of wavelengths from the spectroscopic signals 118 to generate a plurality of absorption spectrum signals 138. In one embodiment, the wavelength separation unit 122 is configured to select a frequency band of interest from a spectroscopic signal corresponding to each of the plurality of directions to detect the plurality of absorption spectrum signals 138. The plurality of units 126, 128, 132, 130, 104, 108 of the measurement subsystem 116 is communicatively interconnected to each other by a communications bus 144.

In an embodiment, where a two-dimensional (2D) profile measurement is desired, the laser beam 114 is emitted in a plurality of directions within an exhaust plane of the exhaust chamber 112. Similarly, in an embodiment, where a three-dimensional (3D) profile measurement is desired, the laser beam 114 is emitted in a plurality of directions within an exhaust volume of the exhaust chamber 112. In one embodiment, the laser beam 114 emitted by the laser source 106 is modulated with a plurality of modulation depths. The emitter 104 is configured to launch the laser beam 114 into the exhaust chamber 112 facilitating interaction of the laser beam 114 with the exhaust emission 110 to generate the spectroscopic signals 118. Also, the detector 108 is configured to receive the spectroscopic signals 118. In one embodiment, the detector 108 is configured to detect the plurality of absorption spectrum signals 138 corresponding to the plurality of modulation depths for each direction. The measurement subsystem 116 may further include a plurality of optical elements such as, but not limited to, mirrors, reflectors and lenses used to direct the laser beam 114 towards the detector 108.

In one embodiment, the measurement unit 126 includes a gantry 134 and/or an unmanned aerial vehicle (UAV) 136. Further, the measurement unit 116 may be configured to facilitate movement of at least one of the emitter 104 and the detector 108 using control signals 120 to achieve a line of sight alignment in each direction. In some embodiments, the gantry 134 is employed to facilitate movement of at least one of the emitter 104, the detector 108, and the plurality of optical elements. In other embodiments, the UAV 136 is used to facilitate movement of at least one of the emitter 104, the detector 108, and the optical elements. In some embodiments, at least one of the gantry 134 and the UAV 136 is configured to house at least one of the emitter 104 and the detector 108. In a specific example, at least one of the gantry 134 and the UAV 136 is configured to traverse at least one of the emitter 104 and the detector 108 along a circular path in a three-dimensional space.

In one embodiment, the emitter 104 and the detector 108 are stationary and the measurement unit 126 is configured to facilitate movement of one or more of the optical elements (not shown in FIG. 1) such as a mirror to achieve a line of sight alignment in each direction. In some embodiments, the measurement unit 126 is configured to alter a position of at least one of the emitter 104 and the detector 108 in an exhaust plane of the exhaust emission 110. In an alternative embodiment, the measuring unit 126 is further configured to alter the position of at least one of the emitter 104 and the detector 108 via traversal of at least one of the gantry 134 and the UAV 136 along the exhaust plane. The measurement unit 126 is further configured to deflect the direction of the laser beam 114 in an exhaust plane of the exhaust emission 110 via use of one or more of the optical elements to provide an optical path between the emitter 104 and the detector 108.

The model generator unit 132 is communicatively coupled to the processing unit 128 and configured to generate one or more models for generating a multi-dimensional profile of the emission parameter. In one embodiment, the model generator unit 132 is configured to determine a parameter model for the emission parameter. In one example, the parameter model for the emission parameter is a polynomial model modelled using polynomial functions. In another embodiment, the emission parameter is modeled using other linear or non-linear functions. In yet another embodiment, the model generator unit 132 is configured to model the emission parameter as a piecewise polynomial function. Specifically, in one example, a single-dimensional temperature profile of the exhaust chamber 112 of the engine is modelled by a set of three piecewise quadratic functions. The set of three quadratic functions are representative of the temperature profile of the exhaust chamber 112 as a function of a distance from the emitter 104 to a point along the laser path towards the detector 108. The laser path length is partitioned into three regions and in each region, the temperature profile is modelled by a quadratic function. In another embodiment, a single-dimensional concentration parameter corresponding to a species in the exhaust emission 110 is modelled by a set of three piecewise quadratic functions. The set of three piecewise quadratic functions is representative of a concentration profile of the concentration of the species in the exhaust emission 110 as a function of a distance from the emitter 104 to a point along the laser path towards the detector 108. The laser path length is partitioned into three regions and in each region, the concentration profile is modelled by a quadratic function. In other types of engines, single-dimensional parameter profiles may be modelled using other linear and non-linear functions.

In another embodiment, the model generator unit 132 is configured to determine a signal model for each of the plurality of absorption spectrum signals 138. In this embodiment, the model generator unit 132 is configured to model each of the plurality of absorption spectrum signals 138 as a function of a plurality of emission parameters to generate an absorption spectrum model. Specifically, each of the plurality of the absorption spectrum signals 138 is modelled as a non-linear function of an exhaust temperature profile and one or more concentration profiles corresponding to the one or more species parameters in the exhaust emission 110. In general, the absorption spectrum model is a function of the polynomial models corresponding to plurality of emission parameters and a laser system model. In one embodiment, the model generator unit 132 is configured to generate the laser system model for operating the emitter 104. The model generator 132 may also be configured to generate an emission model for estimating one or more emission parameters for a given operating condition of the engine 102. Additionally, the model generator unit 132 may be configured to generate a plurality of reference profiles corresponding to the emission parameter and the emission model. In one embodiment, the plurality of reference profiles is generated offline using spectroscopic experiments based on a reference temperature, pressure, and concentration parameters corresponding to a reference species in the exhaust emission 110. The model generator unit 132 may store the models in a database in the memory unit 130. In certain embodiments, some models may be determined a priori and stored in the memory unit 130. The model generator unit 132 is configured to provide one or more models to the processing unit 128.

Further, the processing unit 128 is communicatively coupled to the measurement unit 126 and configured to determine the multi-dimensional profile 140 of the emission parameter. In one embodiment, the multi-dimensional profile 140 includes a 2D profile of at least one emission parameter. The 2D profile of the emission parameter is generated by determining a plurality of single-dimensional profiles of the emission parameter corresponding to a plurality of directions in an exhaust plane. In another embodiment, the multi-dimensional profile 140 includes a 3D profile of at least one emission parameter. The 3D profile of the emission parameter is generated by determining a plurality of single-dimensional profiles of the emission parameter corresponding to a plurality of directions in an exhaust volume. Each of the plurality of single-dimensional profiles is determined based on the plurality of absorption spectrum signals 138 corresponding to each respective direction of the plurality of directions.

In one embodiment, the processing unit 128 is configured to determine the single-dimensional profile using an optimization technique. The processing unit 128 is configured to formulate an optimization problem based on the plurality of absorption spectrum signals 138, the parameter model, and the signal model. In other embodiments, additional models such as, but not limited to, the emission model and the laser system model may also be used in formulating the optimization problem. In this example, the processing unit 128 is configured to generate a plurality of simulated spectrum signals based on the laser system model, the absorption spectrum model and the polynomial model. In one embodiment, the processing unit 128 may be configured to select the polynomial model and the absorption spectrum signal model stored in the memory unit 130. In other embodiments, the processing unit 128 may be configured to select a non-linear function model as an alternative to the polynomial model. The plurality of simulated spectrum signals and the plurality of absorption spectrum signals are used by the optimization technique to modify the absorption spectrum model. The processing unit 128 is further configured to determine an optimal solution for the optimization problem using a suitable optimization technique. The optimal solution corresponds to an optimal absorption spectrum model and the polynomial model.

Moreover, the processing unit 128 is further configured to determine the polynomial model representative of the single-dimensional profile based on the optimal solution. The polynomial model is representative of a profile of the emission parameter along a specified direction. In alternative embodiments, other optimization techniques such as, but not limited to, a genetic optimization technique may be used for determining the optimal solution. In one embodiment, an optimal signal model is determined as part of the optimal solution. In this example, the processing unit 128 is further configured to determine an inverse model corresponding to the optimal signal model. In another embodiment, an optimal inverse signal model is directly determined as part of the optimal solution. In both these embodiments, the single-dimensional profile of the emission parameter is determined based on the inverse model of the optimal signal model. In one embodiment, the optimal solution may be obtained through Monte Carlo simulations.

The processing unit 128 is further configured to generate the multi-dimensional profile 140 of the emission parameter based on the plurality of single-dimensional profiles. By way of example, a plurality of single-dimensional temperature profiles corresponding to a plurality of directions of the exhaust plane is determined. A 2D temperature profile is generated based on the plurality of single-dimensional temperature profiles. In another example, a plurality of single-dimensional pressure profiles corresponding to a plurality of directions of the exhaust plane is determined. A 2D pressure profile is generated based on the plurality of single-dimensional pressure profiles. In yet another example, a plurality of single-dimensional concentration profiles corresponding to a plurality of directions of the exhaust plane is determined. These single-dimensional concentration profiles correspond to one of the plurality of species in the exhaust emission 110. A 2D concentration profile corresponding to the one of the plurality of species is generated based on the plurality of single-dimensional concentration profiles.

Additionally, the processing unit 128 is configured to control the engine 102 for optimal performance, based on the multi-dimensional profile 140 of the emission parameter. To that end, the processing unit 128 is configured to generate the control signal 124 based on the multi-dimensional profile 140. The control signal 124 is used for modifying the operating parameters of the engine 102 to control the exhaust emission 110. In particular, the processing unit 128 is configured to control the engine 102 via use of the control signal 124. As previously noted, the emission parameter includes a temperature parameter of the exhaust emission 110, a pressure parameter of the exhaust emission 110, a concentration parameter of at least one of the plurality of species of the exhaust emission 110. In one example, if the temperature profile of the exhaust emission 110 exceeds a determined temperature threshold, the control signal 124 may be generated by the processing unit 128, and used to alter the operation of the engine 102 to reduce the exhaust temperature. In another example, when the concentration profile of a gaseous component in the exhaust emission 110 exceeds a determined concentration threshold, the control signal 124 may be generated and employed to alter the operation of the engine 102 to reduce the concentration of the gaseous component in the exhaust emission 110.

The processing unit 128 may include one or more processors. The terms 'processor unit,' 'one or more processors,' and 'processor' are used equivalently and interchangeably. The processing unit 128 may include an arithmetic logic unit, a microprocessor, a general purpose controller, or a processor array to perform the desired computations or run a computer program to provide more functionalities of the emitter 104, the detector 108, the measurement unit 126, the memory unit 130 and the model generator unit 132. While the processing unit 128 is shown as a separate unit in the example of FIG. 1, there may be multiple processor units in the measurement subsystem 116. Alternatively, the measurement subsystem 116 may be a distributed system where one or more of the units 126, 130, 132, the emitter 104 and the detector 108 are communicatively coupled to one or more processors that are disposed at a remote location, such as a central server or cloud based server via a communications link such as a computer bus, a wired link, a wireless link, or combinations thereof. Furthermore, one or more of the units 104, 108, 126, 130, 132 may be standalone hardware components. Other hardware implementations such as field programmable gate arrays (FPGA), application specific integrated circuits (ASIC) or customized chip may be employed for one or more of the units of the measurement subsystem 116.

Moreover, the memory unit 130 may be a non-transitory storage medium. For example, the memory unit 130 may be a dynamic random access memory (DRAM) device, a static random access memory (SRAM) device, flash memory or other memory devices. In one embodiment, the memory unit may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. A non-transitory computer readable medium may be encoded with a sequence of instructions to enable at least one processing unit to perform measurement of the emission parameter profile.

Figure 2:
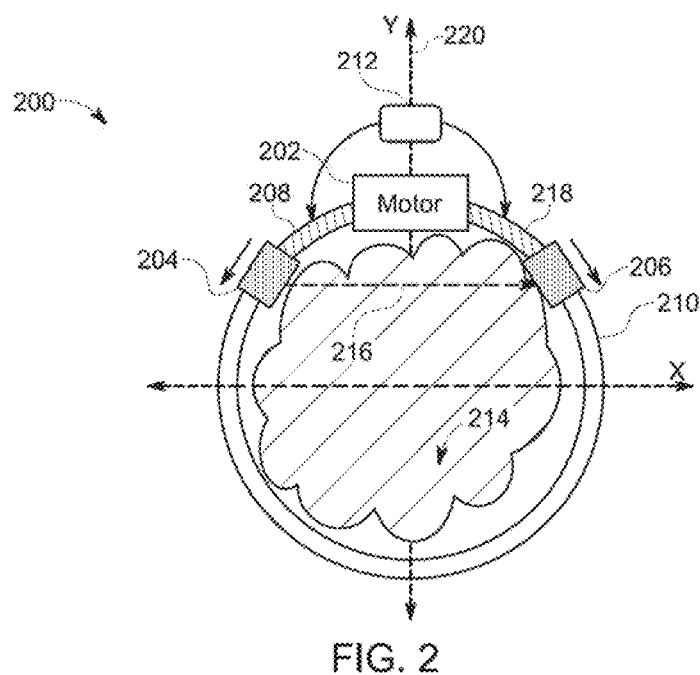
FIG. 2 is a diagrammatic representation of one embodiment of a gantry for use in the system of FIG. 1, for determining a multi-dimensional profile of an emission parameter, in accordance with aspects of the present specification.

FIG. 2 illustrates one embodiment of a gantry 200 for use in the system 100 of FIG. 1, in accordance with aspects of the present specification. The gantry 200 includes a motor 202. Moreover, an emitter 204 and a detector 206 are mounted on a circular track 210 around an exhaust plane 214. It may be noted that measurements are obtained around the exhaust plane 214. The gantry 200 also includes an adjustment unit 212 configured to move the emitter 204 and the detector 206 to achieve a line of sight alignment along a linear path 216. The adjustment unit 212 includes a first adjustable arm 208 configured to couple the motor 202 to the emitter 204 and a second adjustable arm 218 configured to couple the motor 202 to the detector 206. In the illustrated embodiment, the emitter 204 and the detector 206 have a line of sight alignment along the circular track 210 in the exhaust plane 214. The first adjustable arm 208 is extendable along a counter clockwise direction and the second adjustable arm 218 is extendable along a clockwise direction.

Moreover, the motor 202 is positioned along a radial direction 220 and is movable in a clockwise direction, thereby facilitating measurement along the linear path 216. It may be noted that the linear path 216 is perpendicular to the radial direction 220. In other embodiments, the motor 202 may also be movable in a counter clockwise direction.

The adjustment unit 212 may receive control signals for at least one of the motor 202, the first adjustable arm 208, and the second adjustable arm 218 from the measurement unit 126 of FIG. 1. In other embodiment, the gantry 200 may be operated in a manual mode by an operator or in a semi-automatic mode by the operator in conjunction with the measurement unit 126. Although the embodiment of the gantry 200 of FIG. 2 is described as being employed for measuring a 2D profile of at least one emission parameter, in alternative embodiments, the gantry 200 may also include additional components to facilitate measurement of a 3D profile of the at least one emission parameter.

Figure 3:
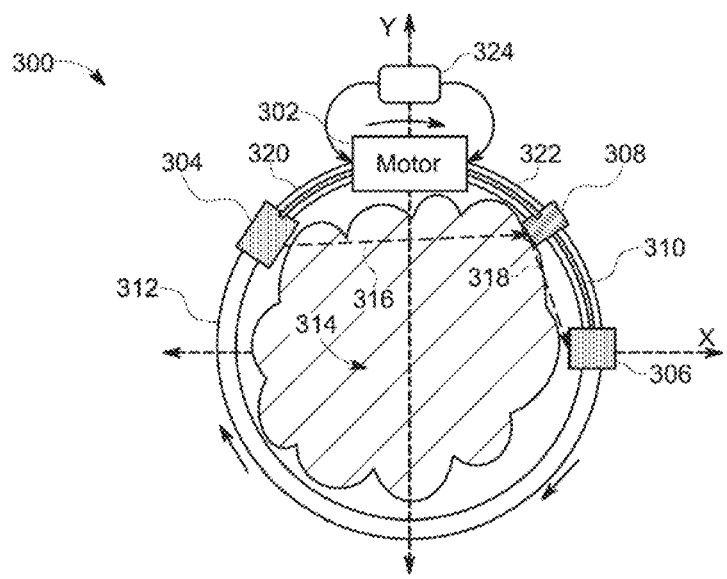
FIG. 3 is a diagrammatic representation of another embodiment of a gantry for use in the system of FIG. 1, for determining a multi-dimensional profile of an emission parameter, in accordance with aspects of the present specification.

FIG. 3 is another embodiment of a gantry 300 for use in the system 100 of FIG. 1, in accordance with aspects of the present specification. The gantry 300 includes a motor 302, an emitter 304, a detector 306, and at least one optical element 308 mounted on a circular track 312 around an exhaust plane 314 of measurement. The gantry 300 also includes an adjustment unit 324 configured to move at least one of the emitter 304, the detector 306, and the optical element 308 to perform measurements along a path represented by two linear paths 316, 318. The adjustment unit 324 includes a first arm 320 coupling the motor 302 with the emitter 304 and a second arm 322 coupling the motor 302 with the optical element 308. The second arm 322 also includes an extendable arm 310 to couple the optical element 308 with the detector 306. The optical element 308 may include a partial reflector. In one embodiment, at least one of the first arm 320 and the second arm 322 is a fixed arm. In another embodiment, at least one of the first arm 320 and the second arm 322 is extendable along the circular track 312.

Also, the motor 302 is movable in a clockwise direction to facilitate measurements along the two linear paths 316, 318 in the exhaust plane 314. In other embodiments, the motor 302 may be movable in a counter clockwise direction. The adjustment unit 324 may receive control signals for at least one of the motor 302, the first arm 320, and the second arm 322 from the measurement unit 126 of FIG. 1. In other embodiments, the gantry 300 may be operated in a manual mode by an operator or in a semi-automatic mode by the operator in conjunction with the measurement unit 126. Although, the gantry 300 is useful for measuring a 2D profile of at least one emission parameter, in alternative embodiments, the gantry 300 may also include additional components for measuring a 3D profile of the at least one emission parameter.

Figure 4:
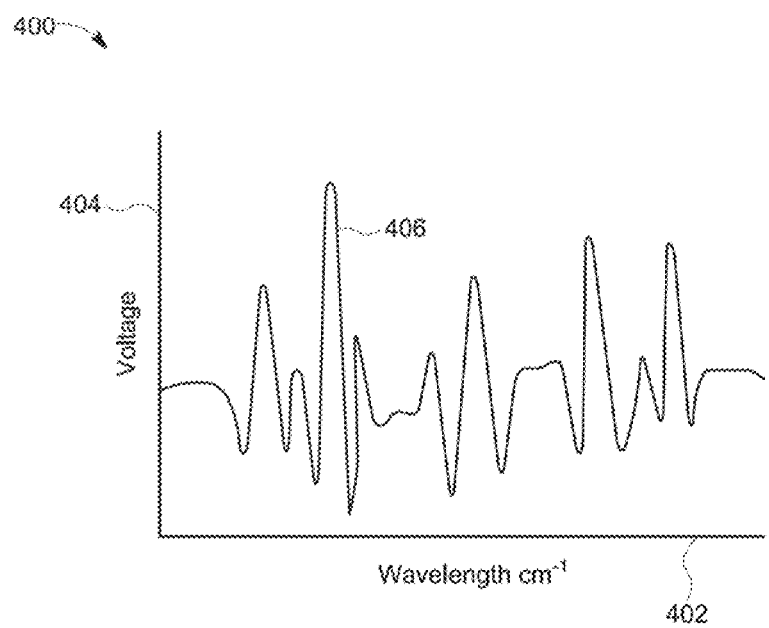
FIG. 4 is a graphical representation of a measured absorption spectrum signal, in accordance with aspects of the present specification.

FIG. 4 is a graphical representation 400 of a measured absorption spectrum signal, in accordance with aspects of the present specification. The graph 400 includes an x-axis 402 representative of a wavelength and a y-axis 404 representative of a voltage intensity.

The graph 400 includes a curve 406 representative of an absorption spectrum signal corresponding to a modulation depth of a laser beam launched in a particular direction. The curve 406 is a modelled as a non-linear function of a plurality of single-dimensional profiles corresponding to a plurality of emission parameters. Each of the plurality of single-dimensional profiles used in the modelling of the absorption spectrum signal represented by the curve 406 is modelled by a piecewise quadratic function. A plurality of absorption spectrum signals corresponding to a plurality of modulation depths is obtained from an exhaust chamber for each of the plurality of directions. It may be noted that the curve 406 is similar to a curve representative of one of a plurality of simulated spectrum signals corresponding to the plurality of absorption spectrum signals. The plurality of simulated absorption spectrum signals is generated using the absorption spectrum model and used during optimization.

Figure 5:
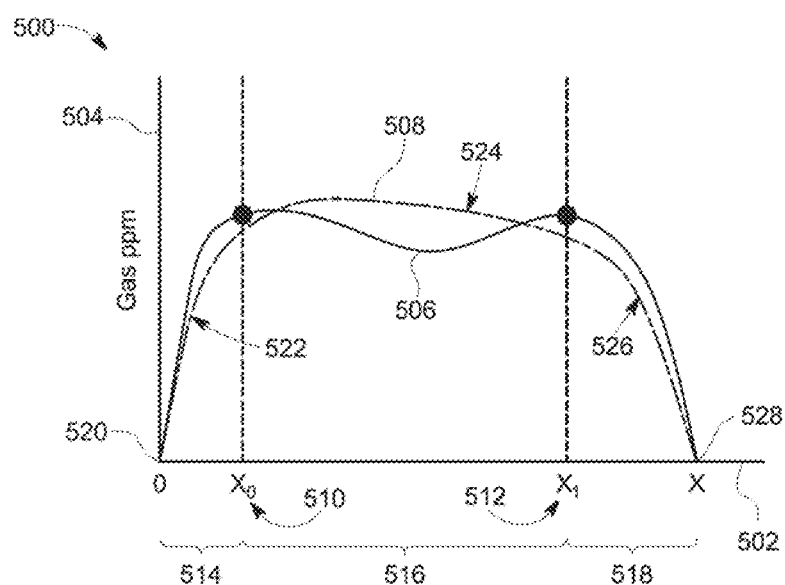
FIG. 5 is a graphical representation of an estimated profile parameter, in accordance with aspects of the present specification.

FIG. 5 is a graphical representation 500 of an estimated profile parameter using a polynomial model, in accordance with aspects of the present specification. The graph 500 includes an x-axis 502 representative of a distance from an emitter to a point in an exhaust plane along a linear path towards a detector. Also, the graph 500 includes a y-axis 504 representative of a concentration of a gaseous component in an exhaust emission in parts per million (ppm). The graph includes a first curve 506 corresponding to a measured concentration profile of a gaseous component in the exhaust emission. The graph 500 also includes a second curve 508 corresponding to a model of a measured concentration profile of the exhaust emission. The second curve 508 represented by a first portion 522, a second portion 524 and a third portion 526 is modelled by a plurality of quadratic equations.

In the example of FIG. 5, the first portion 522 of the curve 508 corresponding to distance values in a first range 514 from a point 520 to a point 510 is a graphical representation of a first quadratic equation. The second portion 524 of the curve 508 corresponding to distance values in a second range 516 from the point 510 to a point 512 is a graphical representation of a second quadratic equation. Further, a third portion 526 of the curve 508 corresponding to distance values in a third range 518 from the point 512 to a point 528 is a graphical representation of a third quadratic equation. It may be observed that the second curve 508 representing the model of the measured concentration profile closely matches with the values represented by the first curve 506 that is generated based on measurements.

Figure 6:
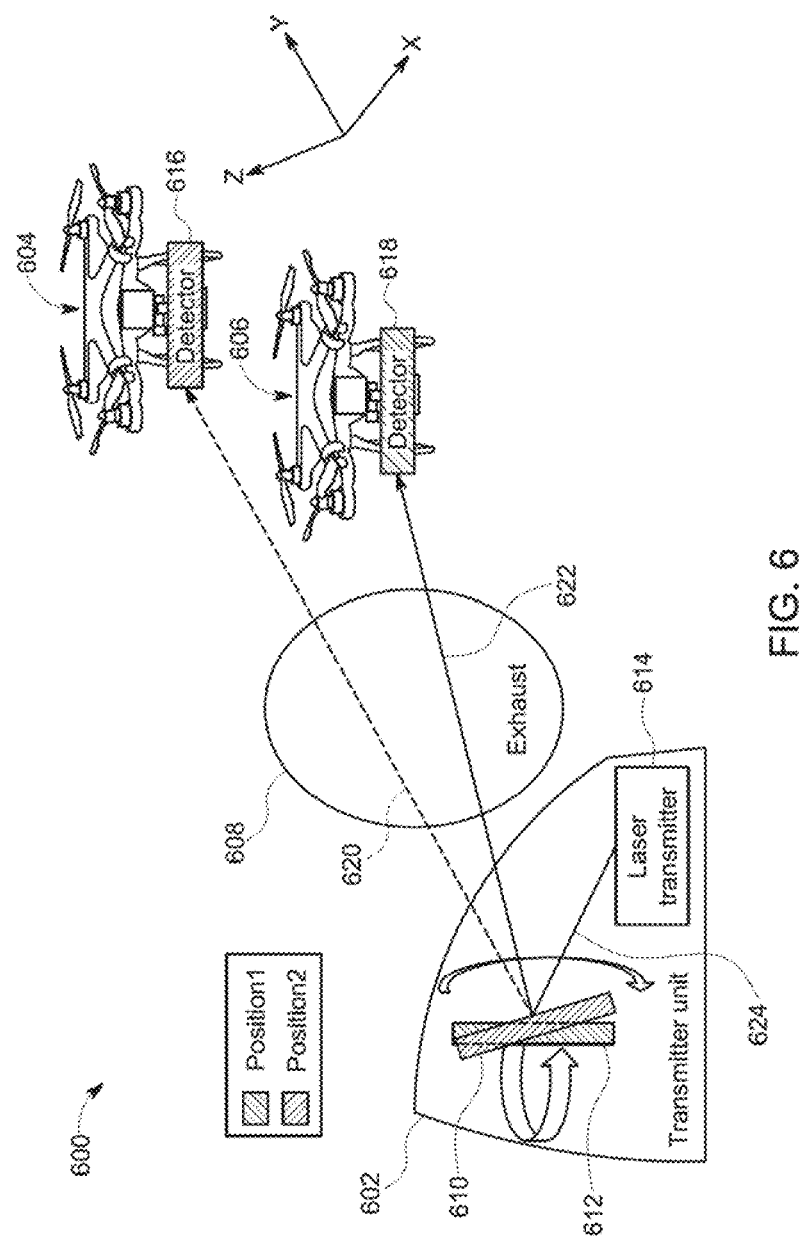
FIG. 6 is another embodiment of a system for determining a multi-dimensional profile of an emission parameter, in accordance with aspects of the present specification.

FIG. 6 is another embodiment of a system 600 for determining a multi-dimensional profile of a parameter related to one or more species in an exhaust emission of a combustion process, in accordance with aspects of the present specification. The system 600 includes an emitter 602 configured to transmit laser beams 620, 622 through an exhaust emission 608. The emitter 602 includes a laser transmitter 614 configured to generate a laser beam 624. In addition, the emitter 602 includes a movable reflecting unit 610 configured to reflect the emitted laser beam 624 in a plurality of directions in the exhaust emission 608. In one embodiment, the reflecting unit 610 includes a mirror. In addition, the system 600 also includes a UAV 604 having a detector 616 configured to receive spectroscopic signals generated by an interaction of the laser beam 620 with the exhaust emission 608. The system 600 further includes a UAV 606 having a detector 618 configured to receive spectroscopic signals generated by an interaction of the laser beam 622 with the exhaust emission 608.

Although the embodiment of FIG. 2 depicts the system 600 as including two unmanned aerial vehicles (UAVs) 604, 606, in another example, the system 600 may include a single UAV. In this example, reference numerals 604, 606 represent the single UAV corresponding to two angular positions at two different instants of time. Moreover, in the example of two UAVs, the detector 616 is configured to acquire a spectroscopic signal corresponding to the first laser beam 620 and generate an absorption spectrum signal corresponding to the UAV 604 at a first angular position. Furthermore, the detector is configured to acquire a spectroscopic signal corresponding to the second laser beam 622 and generate a second absorption spectrum signal corresponding to the UAV 606 at a second angular position. The movements of the reflecting unit 610 and the UAV are synchronized during acquisition of the plurality of absorption spectrum signals.

In other embodiments, any number of UAVs may be used for acquiring spectroscopic signal. In such examples, two or more UAVs having corresponding detectors may be positioned at different angular positions and configured to acquire a spectroscopic signal corresponding to an associated laser beam/path and generate a corresponding absorption spectrum signal.

Figure 7:
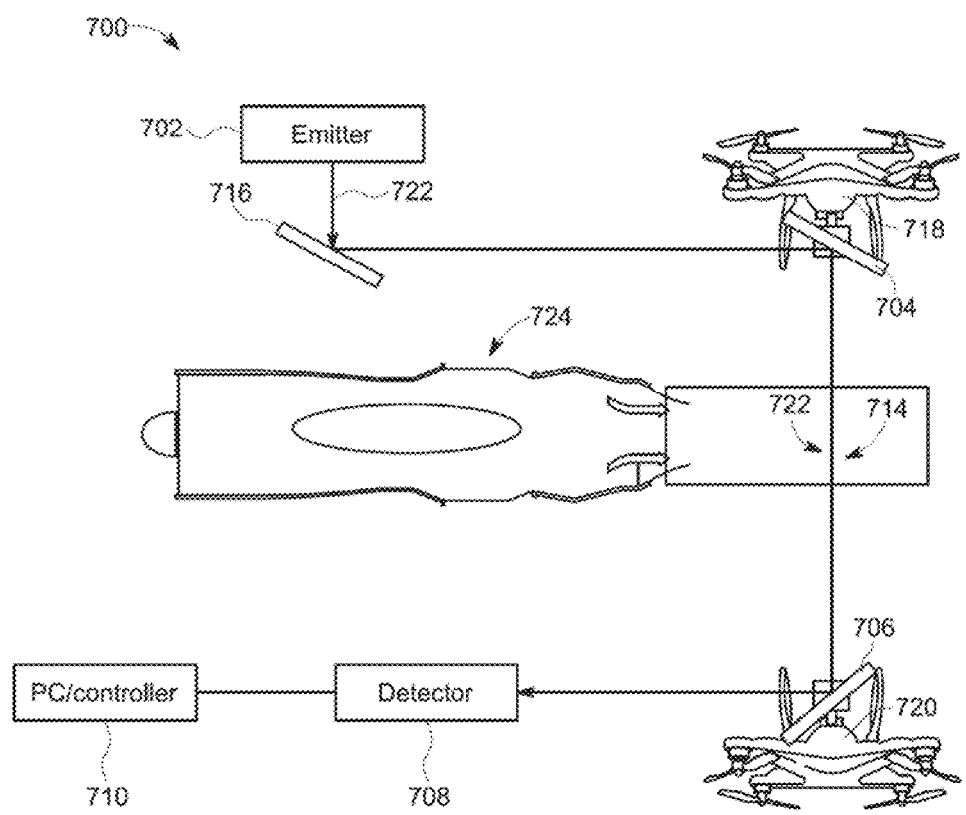
FIG. 7 is yet another embodiment of a system for determining a multi-dimensional profile of an emission parameter, in accordance with aspects of the present specification.

FIG. 7 is another embodiment of a system 700 for determining a multi-dimensional profile of a parameter related to one or more species in an exhaust emission of a combustion process, in accordance with aspects of the present specification. The system 700 includes an emitter 702 configured to transmit a laser beam 722 through an exhaust emission 714 of an engine 724. Moreover, the system 700 includes a plurality of optical elements 716, 704, 706 configured to direct the emitted laser beam 722 through the exhaust emission 714. The optical elements may include mirrors. In addition, the system 700 includes a detector 708 configured to receive a spectroscopic signal generated by an interaction of the emitted laser beam 722 with the exhaust emission 714.

In the illustrated embodiment of FIG. 7, the emitter 702 and the detector 708 are disposed in a fixed position. Further, in the example of the system 700 of FIG. 7, three optical elements 716, 704, 706 are used to direct the laser beam 722 from the emitter 702 to the detector 708 through the exhaust emission 714. In one embodiment, the optical elements 716, 704, 706 are a plurality of mirrors. Moreover, the system 700 includes two UAVs 718, 720. Furthermore, the mirror 704 is associated with the UAV 718 and the mirror 706 is associated with the UAV 720. These mirrors 704, 706 in the UAVs 718, 720 are configured to direct the laser beam 722 in a plurality of directions in the exhaust emission 714. The movements of the two UAVs 718, 720 are synchronized during acquisition of the plurality of absorption spectrum signals. The system 700 further includes a controller 710 communicatively coupled to the detector 708 and configured to perform the functions of the processing unit 128 of FIG. 1.

Figure 8:
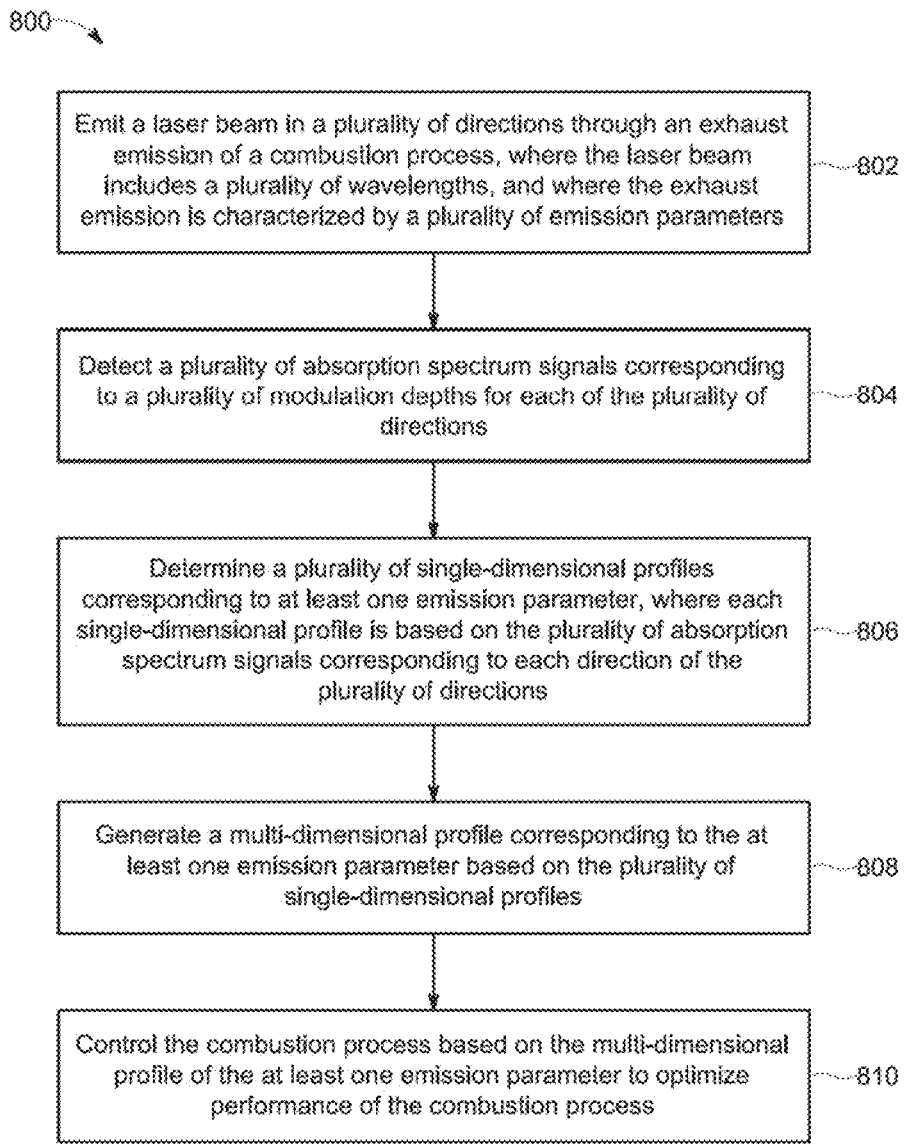
FIG. 8 is a flow chart of a method for determining a multi-dimensional profile of an emission parameter, in accordance with aspects of the present specification.

FIG. 8 is a flow chart 800 of a method for determining a multi-dimensional profile of a parameter related to one or more species in an exhaust emission of a combustion process, in accordance with aspects of the present specification. The method 800 is described with reference to the elements of FIG. 1.

The method 800 includes emitting a laser beam in a plurality of directions through an exhaust emission of a combustion process, as indicated by step 802. The laser beam 114 is emitted by the laser source 106 of FIG. 1. As previously noted, the exhaust emission 110 is characterized by a plurality of emission parameters. The laser beam 114 includes a plurality of wavelengths and is modulated with a plurality of modulation depths. In one embodiment, the emission parameter includes a profile of the parameter in a one-dimensional (1D) space, a 2D space, a 3D space, or combinations thereof.

Further, at step 804, a plurality of absorption spectrum signals corresponding to the plurality of modulation depths for each of the plurality of directions is detected by the detector 108. The plurality of absorption spectrum signals is detected by emitting the laser beam 114 in a plurality of directions in the exhaust emission 110 and acquiring spectroscopic signals corresponding to each of the plurality of directions by the detector 108. The detection of the plurality of absorption spectrum signals further includes processing the spectroscopic signal corresponding to each of the plurality of directions and selecting a frequency band of interest to generate a corresponding absorption spectrum signal by the wavelength separation unit 122.

Subsequently, at step 806, a single-dimensional profile corresponding to at least one emission parameter is determined based on the plurality of absorption spectrum signals in each direction by the processing unit 128 of FIG. 1. Consequently, a plurality of single-dimensional profiles of the emission parameter is generated. In one embodiment, an optimization technique is used to determine an estimate of the profile of the emission parameter. The optimization technique uses a profile parameter model representative of the profile of the emission parameter, a signal model representative of absorption spectrum signal, and the plurality of absorption spectrum signals. In one embodiment, the profile parameter model is a combination of a plurality of quadratic equations. In another embodiment, the profile parameter model may be represented by a combination of a linear equation and a quadratic equation. Further, the signal model is represented as a non-linear function of profiles of one or more of emission parameters. In one embodiment, the profile parameter model and the signal model are generated by the model generator unit 132 of FIG. 1.

Moreover, as indicated by step 808, a multi-dimensional profile of the emission parameter is generated by the processing unit 128 based on the plurality of single-dimensional profiles. The multi-dimensional profile 140 of the emission parameter is an aggregation of the plurality of single-dimensional profiles of the emission parameter. In one embodiment, if it is desirable to generate a 3D profile of an emission parameter, a plurality of 2D parameter profiles corresponding to a volume of interest is used to generate the 3D profile of the emission parameter. Alternatively, a plurality of 1D profiles of the emission parameter is determined using a plurality of absorption spectrum signals corresponding to a plurality of directions in the volume of interest.

Further, at step 810, the combustion process of an engine may be controlled based on the multi-dimensional-dimensional profile of the at least one emission parameter to optimize performance of the combustion process/engine. In one embodiment, the multi-dimensional profile is analyzed via use of a threshold profile pattern and a control signal is generated based on the analysis. The control signal 124 is used to modify one or more engine operating parameters to alter the parameter profile of one or more of emission parameters to enhance/optimize the performance of the engine 102, thereby ensuring compliance with regulatory guidelines or facilitating enhanced management of a maintenance schedule. The control signal 124 is generated by the processing unit 128. Further, the multi-dimensional profile 140 may also be visualized on the display unit 142 of FIG. 1 by the processing unit 128.

Various systems and methods for determining a multi-dimensional profile of an emission parameter are presented. Use of these systems and methods allows easy 3D mapping. Additionally, these systems and methods provide full flexibility to traverse the gantry along any desired trajectory Moreover, use of optical elements on the UAVs aids in enhancing measurement resolution by increasing the path length of the laser beam through the exhaust emission. Further, positional information of the UAV may be used for automatic alignment of the detector with the emitter. The exemplary systems are portable and do not require any fixed infrastructure. In addition, the systems allow deployment of different laser packages adopted for specific gases of interest. Also, the system is modular and hence entails minimum maintenance and calibration efforts.

The above-described embodiments should be regarded as illustrative rather than restrictive. It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for determining a multi-dimensional profile of at least one emission parameter of a plurality of emission parameters corresponding to an exhaust emission of a combustion process, the method comprising:
    emitting a laser beam in a plurality of directions through the exhaust emission of the combustion process, wherein the laser beam comprises a plurality of wavelengths, and wherein the exhaust emission is characterized by the plurality of emission parameters;
    detecting a plurality of absorption spectrum signals corresponding to a plurality of modulation depths for each of the plurality of directions;
    determining a plurality of single-dimensional profiles corresponding to the at least one emission parameter, wherein each of the plurality of single-dimensional profiles is determined based on the plurality of absorption spectrum signals corresponding to each respective direction of the plurality of directions; and
    generating the multi-dimensional profile corresponding to the at least one emission parameter based on the plurality of single-dimensional profiles.

2. The method of claim 1, further comprising controlling the combustion process based on the multi-dimensional profile of the at least one emission parameter.

3. The method of claim 1, wherein the plurality of emission parameters comprises at least two of a temperature parameter, a pressure parameter, and a concentration parameter corresponding to a species in the exhaust emission.

4. The method of claim 1, wherein determining the single-dimensional profile of the at least one emission parameter comprises:
    determining a polynomial model corresponding to the at least one emission parameter;
    determining an absorption spectrum model corresponding to the at least one emission parameter based on the plurality of absorption spectrum signals;
    generating a plurality of simulated spectrum signals based on a laser system model, the polynomial model, and the absorption spectrum model; and
    generating the single-dimensional profile corresponding to the at least one emission parameter based on the plurality of simulated spectrum signals and the plurality of absorption spectrum signals using an optimization technique.

5. The method of claim 4, wherein the optimization technique is configured to determine an inverse model corresponding to the absorption spectrum model.

6. The method of claim 1, wherein emitting the laser beam in the plurality of directions comprises altering a position of an emitter in an exhaust plane of the exhaust emission.

7. The method of claim 6, wherein altering the position of the emitter comprises traversing the emitter along the exhaust plane via use of at least one of a gantry and an unmanned aerial vehicle.

8. The method of claim 1, wherein generating the plurality of absorption spectrum signals comprises altering a position of a detector in an exhaust plane of the exhaust emission.

9. The method of claim 8, wherein altering the position of the detector comprises traversing the detector in the exhaust plane via use of at least one of a gantry and an unmanned aerial vehicle.

10. The method of claim 1, further comprises deflecting the direction of the laser beam in an exhaust plane of the exhaust emission via an optical element to provide an optical path between an emitter and a detector.

11. A system for determining a multi-dimensional profile of at least one emission parameter of a plurality of emission parameters corresponding to an exhaust emission of a combustion process, wherein the plurality of emission parameters characterizes the exhaust emission, the system comprising:
    a measurement unit comprising an emitter and a detector, wherein the measurement unit is configured to align the emitter and the detector in a plurality of directions through the exhaust emission, wherein the emitter comprises a laser source and is configured to emit a laser beam comprising a plurality of wavelengths in the plurality of directions, and wherein the detector comprises a wavelength separation unit configured to generate a plurality of absorption spectrum signals corresponding to the plurality of wavelengths for each direction of the plurality of directions;
    a processing unit communicatively coupled to the detector and configured to:
        determine a plurality of single-dimensional profiles corresponding to the at least one emission parameter, wherein each of the plurality of single-dimensional profiles is determined based on the plurality of absorption spectrum signals corresponding to each respective direction of the plurality of directions; and
        generate the multi-dimensional profile corresponding to the at least one emission parameter based on the plurality of single-dimensional profiles.

12. The system of claim 11, wherein the processing unit is further configured to control the combustion process based on the multi-dimensional profile of the at least one emission parameter.

13. The system of claim 11, further comprising a model generator unit communicatively coupled to the processing unit and configured to determine one or more models for use in generating the multi-dimensional profile of the emission parameter.

14. The system of claim 11, wherein the plurality of emission parameters comprises at least two of a temperature parameter, a pressure parameter, and a concentration parameter corresponding to a species in the exhaust emission.

15. The system of claim 11, wherein the processing unit is further configured to:
   determine a polynomial model corresponding to the at least one emission parameter;
   determine an absorption spectrum model corresponding to the at least one emission parameter based on the plurality of absorption spectrum signals;
   generate a plurality of simulated spectrum signals based on a laser system model, the polynomial model, and the absorption spectrum model; and
   generate the single-dimensional profile corresponding to the at least one emission parameter based on the plurality of simulated spectrum signals and the plurality of absorption spectrum signals using an optimization technique.

16. The system of claim 15, wherein the processing unit is configured to determine an inverse model corresponding to the absorption spectrum model.

17. The system of claim 11, wherein the measurement unit comprises at least one of a gantry and an unmanned aerial vehicle, and wherein at least one of the gantry and the unmanned aerial vehicle is configured to:
   house at least one of the emitter and the detector; and
   traverse at least one of the emitter and the detector along a path in a three-dimensional space.

18. The system of claim 17, wherein the measurement unit is further configured to alter a position of at least one of the emitter and the detector in an exhaust plane of the exhaust emission.

19. The system of claim 18, wherein the measurement unit is configured to alter the position of at least one of the emitter and the detector via traversal of at least one of the gantry and the unmanned aerial vehicle along the exhaust plane of the exhaust emission.

20. The system of claim 11, further comprising a display unit configured to visualize the multi-dimensional profile corresponding to the at least one emission parameter.

* * * * *